US012574409B2

(12) United States Patent
Hu et al.

(10) Patent No.: US 12,574,409 B2
(45) Date of Patent: Mar. 10, 2026

(54) PLATFORM-AGNOSTIC SAAS PLATFORM PHISHING URL RECOGNITION

(71) Applicant: Palo Alto Networks, Inc., Santa Clara, CA (US)

(72) Inventors: Lucas Hu, San Francisco, CA (US); Jingwei Fan, Chapel Hill, NC (US); Wei Wang, Milpitas, CA (US); William Redington Hewlett, II, Mountain View, CA (US); Fangyu Deng, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 23 days.

(21) Appl. No.: 18/222,306

(22) Filed: Jul. 14, 2023

(65) Prior Publication Data

US 2025/0023912 A1      Jan. 16, 2025

(51) Int. Cl.
*H04L 9/40* (2022.01)
(52) U.S. Cl.
CPC .............................. *H04L 63/1483* (2013.01)

(58) Field of Classification Search
CPC .................................................. H04L 63/1483
See application file for complete search history.

(56) References Cited

U.S. PATENT DOCUMENTS

| | | | |
|---|---|---|---|
| 11,637,863 B2 * | 4/2023 | Yadav ................... | G06F 16/955 |
| | | | 726/24 |
| 11,882,152 B2 * | 1/2024 | Kurrasch .............. | H04L 63/126 |
| 12,003,535 B2 * | 6/2024 | Stokes, III ............ | H04L 63/168 |
| 2018/0131685 A1 * | 5/2018 | Sridhar ................. | H04L 9/3226 |
| 2021/0203690 A1 * | 7/2021 | Nunes ................... | G06N 3/088 |
| 2021/0203693 A1 * | 7/2021 | Clausen .............. | H04L 63/1425 |
| 2021/0234892 A1 * | 7/2021 | Narayanaswamy ......................... | |
| | | | H04L 63/1483 |

* cited by examiner

*Primary Examiner* — Lynn D Feild
*Assistant Examiner* — Abdullah Almamun
(74) *Attorney, Agent, or Firm* — Van Pelt, Yi & James LLP

(57) ABSTRACT

Techniques for recognizing phishing URLs on Software as a Service (SaaS) platforms are disclosed. A candidate URL is received. A determination is made that the candidate URL is a SaaS hosted URL. In response to the determination, the URL is evaluated using a model trained on SaaS hosted content. A remedial action is performed in response to determining that the received URL is a phishing URL.

33 Claims, 14 Drawing Sheets

900

Receive a URL.      902

Determine that the URL is a SaaS hosted URL and evaluate the URL using a SaaS-trained model.      904

Perform a remedial action in response to determining the URL is a SaaS hosted phishing URL.      906

900

902
Receive a URL.

904
Determine that the URL is a SaaS hosted URL and evaluate the URL using a SaaS-trained model.

906
Perform a remedial action in response to determining the URL is a SaaS hosted phishing URL.

PLATFORM-AGNOSTIC SAAS PLATFORM PHISHING URL RECOGNITION

BACKGROUND OF THE INVENTION

Internet users are under constant attack from cybercriminals. One type of attack is a phishing attack, where the ultimate goal of the attacker is to steal information from the user, such as a social security account number or banking credentials. Unfortunately, as techniques are developed to identify and prevent existing phishing attacks, new attacks are ever emerging, for which existing protections are insufficient. Therefore, an ongoing need exists to detect and mitigate such attacks.

BRIEF DESCRIPTION OF THE DRAWINGS

Various embodiments of the invention are disclosed in the following detailed description and the accompanying drawings.

DETAILED DESCRIPTION

Figure 1:
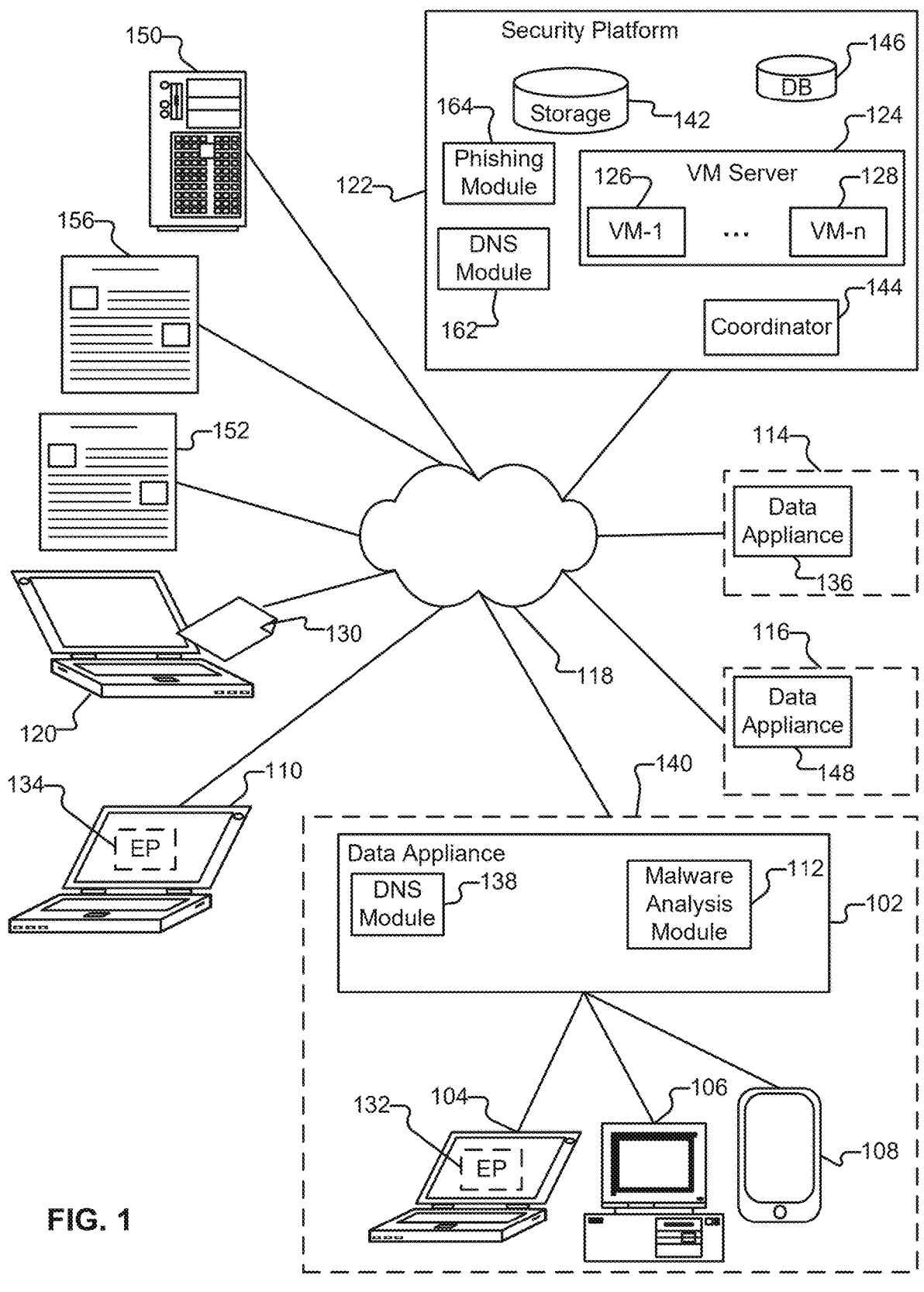
FIG. 1 illustrates an example of an environment in which various types of attacks can be detected and mitigated.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes, dynamically feeding that context into security policies, thereby eliminating the policy lag that may occur when VMs change.

II. Example Environment

FIG. 1 illustrates an example of an environment in which various types of attacks can be detected and mitigated. As will be described in more detail below, information (e.g., as determined by security platform 122) can be variously shared and/or refined among various entities included in the environment shown in FIG. 1. And, using techniques described herein, devices, such as endpoint client devices 104-110 can be protected from various harms.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/ would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package.apk (APK) file that appears to an end user to be a free game, but stealthily sends SMS premium messages (e.g., costing $10 each), running up the end user's phone bill. Another example of malware is an Apple IOS flashlight application that stealthily collects the user's contacts and sends those contacts to a spammer. Other forms of malware can also be detected/thwarted using the techniques described herein (e.g., ransomware). And, while various information is described herein as being generated for malicious applications, techniques described herein can also be used in various embodiments to generate profiles for other kinds of applications (e.g., adware profiles, goodware profiles, etc.). Further, various techniques described herein can be used to protect endpoints (and/or users of such endpoints) against other types of malicious activities, such as detecting and mitigating phishing or other fraudulent websites that may not make use of malware per se.

Techniques described herein can be used in conjunction with a variety of platforms (e.g., desktops, mobile devices, gaming platforms, embedded systems, etc.) and/or a variety of types of applications (e.g., Android.apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140 (belonging to the "ACME Company").

Data appliance 102 is configured to enforce policies regarding communications between clients, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

In various embodiments, data appliance 102 includes a DNS module 138, which is configured to receive (e.g., from security platform 122) a list of domains (e.g., a list of attack domains) for which queries (e.g., made by client device 104), if observed (e.g., within network 140), are problematic. DNS module 148 can also be configured to send (e.g., to security platform 122) DNS query data (e.g., logs of DNS requests made by clients such as client devices 104-108). DNS module 138 can be integrated into appliance 102 (as shown in FIG. 1) and can also operate as a standalone appliance in various embodiments. And, as with other components described throughout the Specification, DNS module 138 can be provided by the same entity that provides appliance 102 (and/or security platform 122), and can also be provided by a third party (e.g., one that is different from the provider of appliance 102 or security platform 122). Further, as with other elements of appliance 102, in various embodiments, the functionality provided by DNS module 138 (or portions thereof) is instead/in addition provided by software executing on a client (e.g., client 104).

Figure 2A:
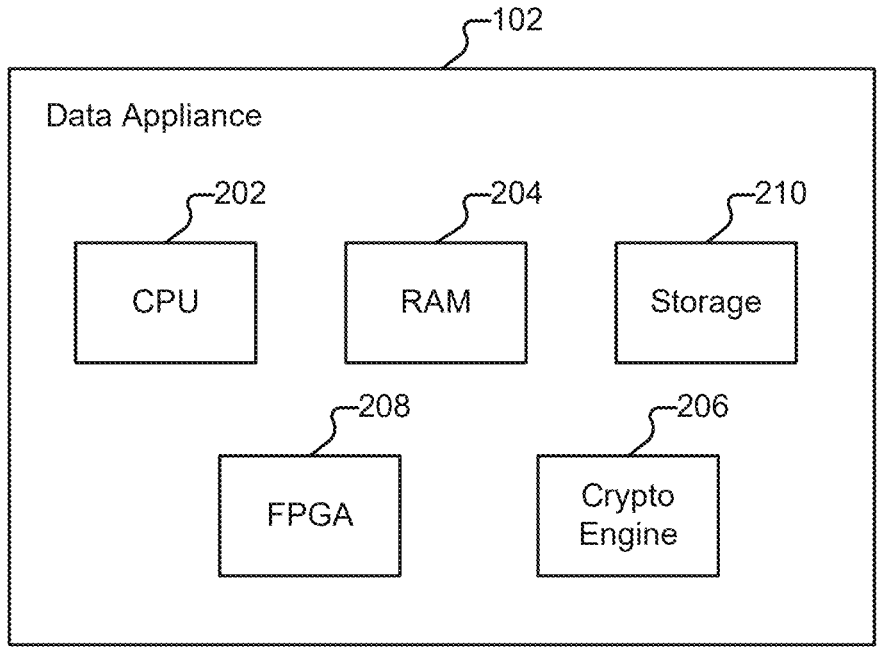
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
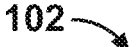
FIG. 2B is a functional diagram of logical components of an embodiment of a data appliance.
Figure 2B:
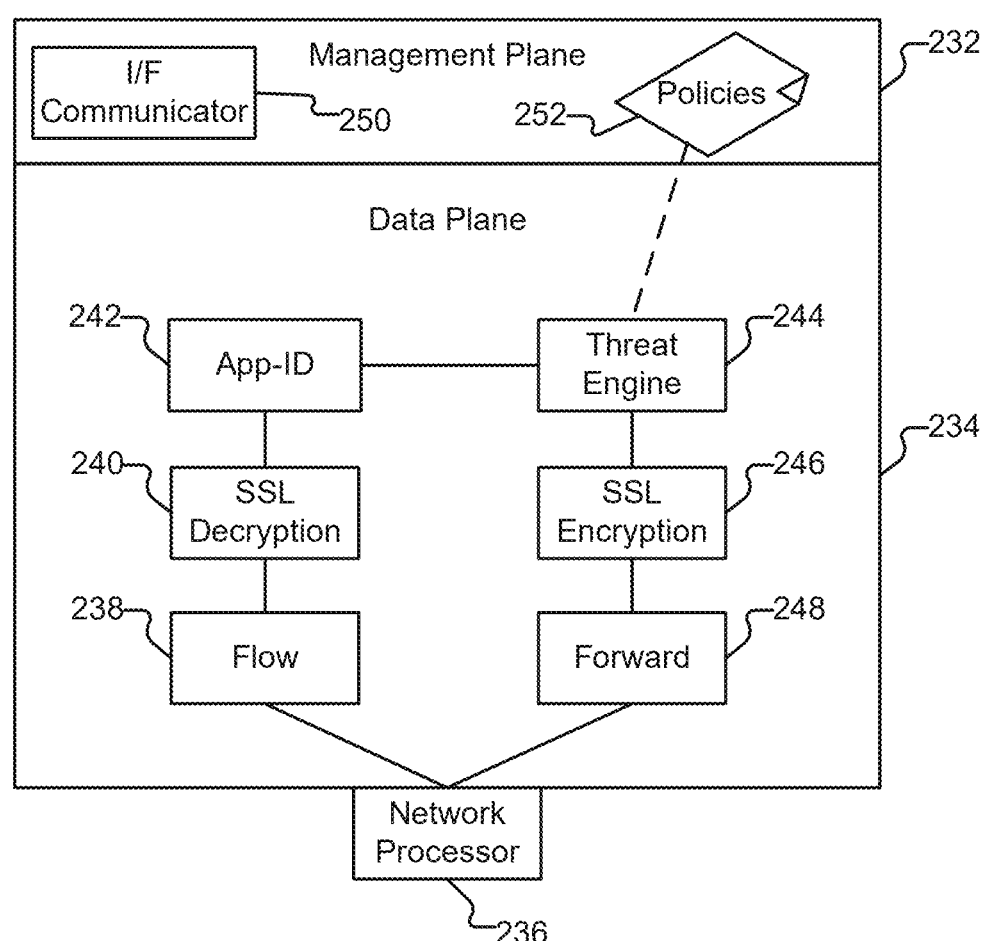

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent to an appropriate decoder. Threat engine 244 is configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104 as an employee of ACME Corporation (who maintains enterprise network 140). A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with a security platform (e.g., security platform 122). As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known benign domains (e.g., site 152) and/or known malicious domains and/or IP addresses (e.g., site 156 and C&C server 150), allowing data appliance 102 to block traffic between enterprise network 140 and those malicious sites. The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by security platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming security platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. An alternate approach is to perform at least some real-time analysis on the attachment on data appliance 102 (e.g., while awaiting a verdict from security platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Security platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

Figure 2C:
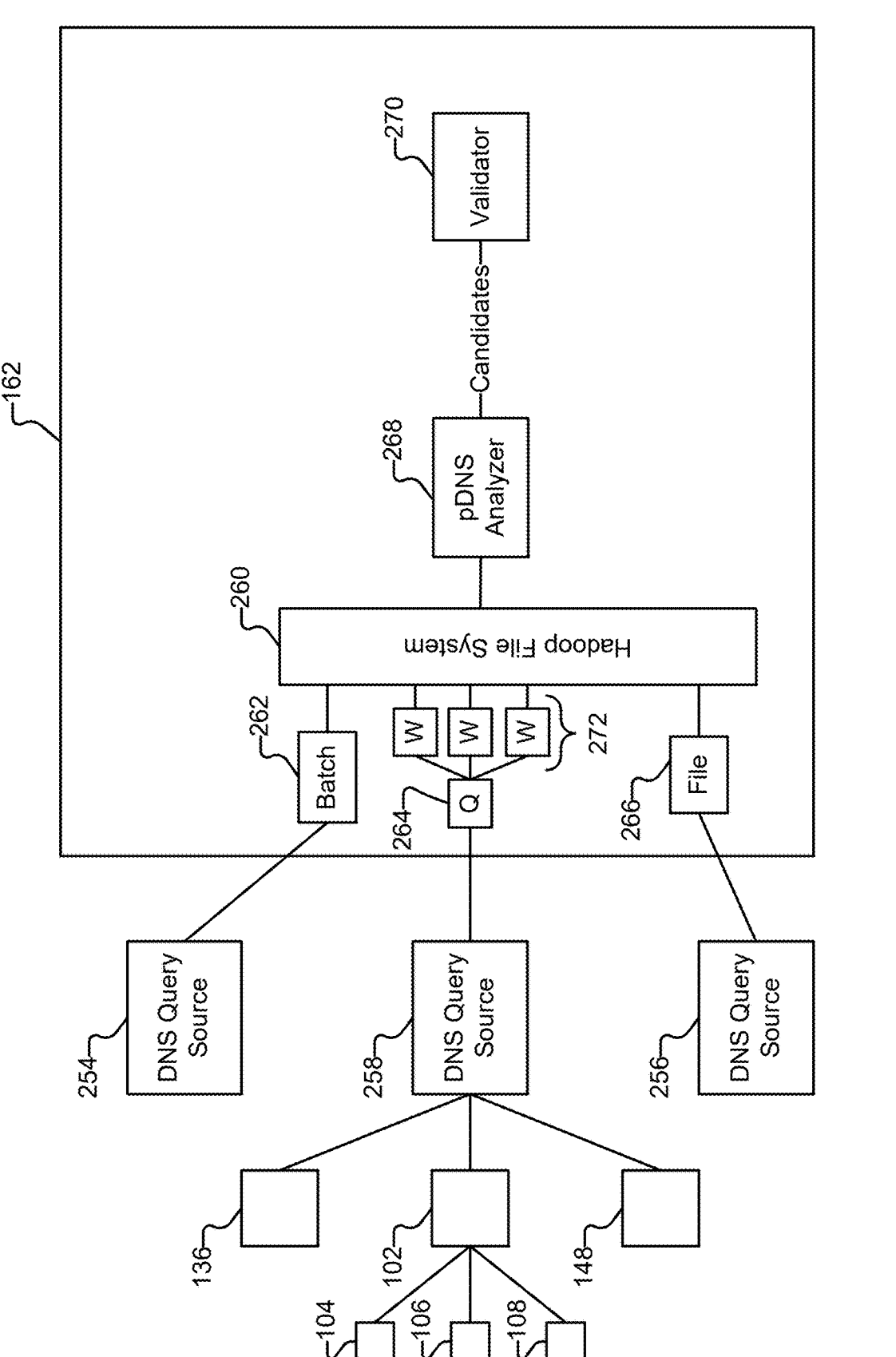
FIG. 2C illustrates an example of a DNS module incorporated into an embodiment of a security platform.

In various embodiments, security platform 122 includes a DNS module 162. DNS module 162 can be implemented in a variety of ways. As shown in FIG. 2C, DNS module 162 makes use of commercially available public cloud resources, such as Amazon Web Services and/or Google Cloud Platform resources. Other platform resources provided by other vendors can also be used, as applicable (e.g., as offered by Microsoft), as can (in various embodiments) commodity server-class hardware.

DNS module 162 receives DNS query information (e.g., passive DNS data) from a variety of sources (254-258), using a variety of techniques. Sources 254-258 collectively provide DNS module 162 with approximately five billion unique records each day. An example of a record is:

abc.com A 199.181.132.250 2023 Jan. 1 12:30:49

The record indicates that, on Jan. 1, 2023, a DNS query was made for the site "abc.com" and at that time, the response provided was the IP address "199.181.132.250" (an "Address record" or "A record"). As used throughout the Specification, references to an "A record" can include both IPv4 (A) address records and IPV6 (AAAA) address records, based, for example, on implementation. In some cases, additional information can also be included. For example, an IP address associated with the requestor may be included in the passive DNS, or may be omitted (e.g., due to privacy reasons). Another example of a record is:

xyz.abc.com NS ns.abc.com 199.123.12.12 2023 Jan. 2 00:30:30

The record indicates that, on Jan. 2, 2023, a DNS query was made for the site "xyz.abc.com" and at that time, the response provided (also referred to as a "referral response" or "Nameserver (NS) record") was to query the nameserver at ns.abc.com for more information about "xyz.abc.com."

Source 254 is a real-time feed of globally collected passive DNS. An example of such a source is Farsight Security Passive DNS. In particular, records from source 254 are provided to DNS module 162 via an nmsgtool client, which is a utility wrapper for the libnmsg API that allows messages to be read/written across a network. Every 30 minutes, a batch process 262 (e.g., implemented using python) loads records newly received from source 254 into an Apache Hadoop cluster (HDFS) 260.

Source 256 is a daily feed of passive DNS associated with malware. An example of such a source is the Georgia Tech Information Security Center's Malware Passive DNS Data Daily Feed. Records from source 256 are provided to DNS module 162 as a single file via scp and then copied into HDFS 260 (e.g., using copyFromLocal on the file location 266 (e.g., a particular node in a cluster configured to receive data from source 256)).

As previously mentioned, appliance 102 can collect DNS queries made by clients 104-108 and provide passive DNS data to security platform 122. In some embodiments, appliances such as appliance 102 directly provide the passive DNS information to security platform 122. In other embodiments, appliance 102 (along with many other appliances) provides the passive DNS information to an intermediary, which in turn provides the information to security platform 122. In the example shown in FIG. 2C, data appliance 102, along with other appliances, such as appliances 136 and 148 (and thousands of other appliances, not pictured), provide their collected DNS information to a server, which in turn provides the collected information (as source 258) to security platform 122. In particular, source 258 provides the collected DNS information to a queue service 264 which in turn uses a set of workers 272 to copy records into HDFS 260. Other technologies can also be used to copy records into HDFS 260, such as Apache Kafka. In various embodiments, the DNS information provided to security platform 122 arrives filtered (e.g., by data appliances such as data appliance 102, by server/source 258, or both). One example of such filtering includes applying a filter specified by an administrator of appliance 102 (e.g., to prevent local DNS query information from leaving network 140).

A domain's activity degree can be quantified by the volume of DNS traffic it receives in a specific time window. When a domain starts hosting a legitimate launched service, its traffic usually grows gradually. It is abnormal for a domain to stay in the dormant status for a long time and then suddenly get a large burst of traffic (e.g., on its awaken date).

In some embodiments, security platform 122 (e.g., using pDNS analyzer 268) uses two thresholds to divide the activity index range into three groups: dormant domains (those below the 75th percentile of the activity index), standard domains (those with traffic in the 75th and 95th percentile), and highly active domains (the top 5%). Other groupings and/or other thresholds can also be used. Security platform 122 can continuously monitor the traffic of dormant domains and identify when activity jumps significantly in a short time window. Such domains exhibiting this behavior can be flagged by security platform 122 as strategically aged domains. The index data can be stored in a variety of ways. As an example, it can be stored in filesystem 260. It can also be stored in database 146. Other metrics can also be determined and stored, such as an awaken date for the domain (which can be set to null for dormant domains that have not yet shown burst activity).

IV. Analyzing Samples Using Static/Dynamic Analysis

Figure 3:
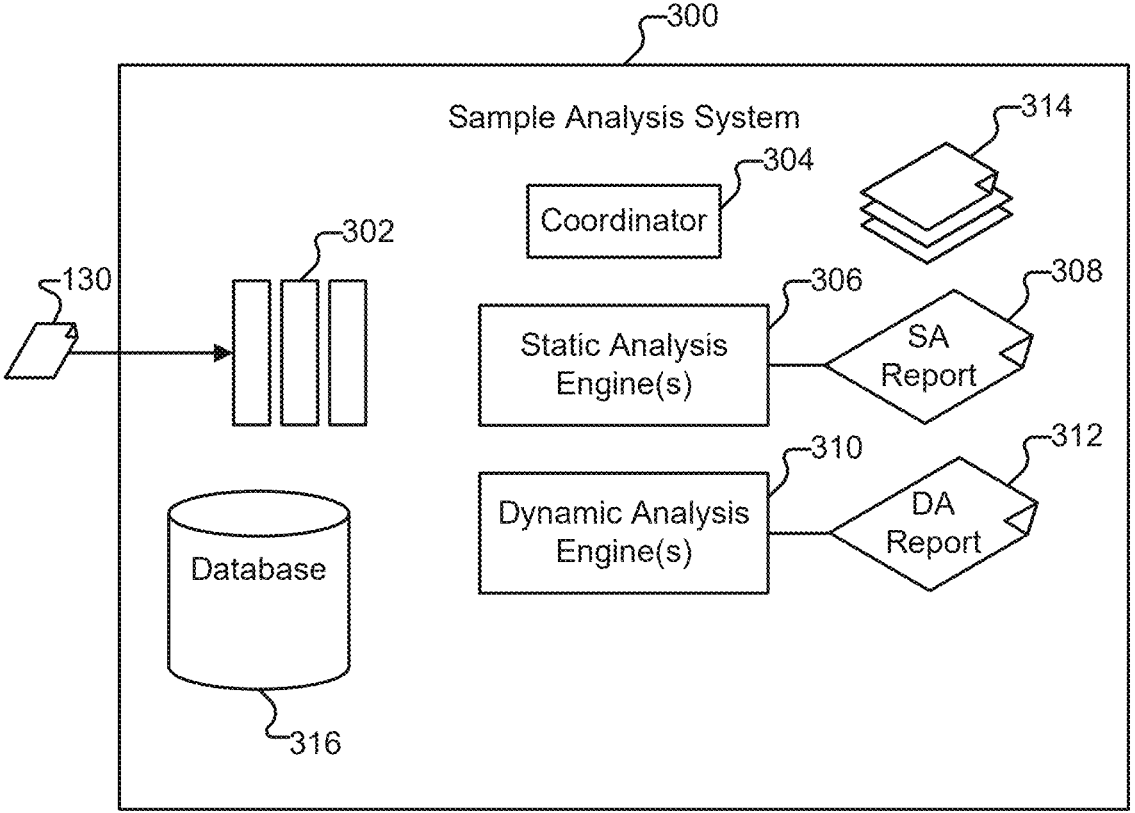
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, malicious file 130 is received by analysis system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Platform-Agnostic Saas Platform Phishing Url Recognition

A. Introduction

Figure 4:
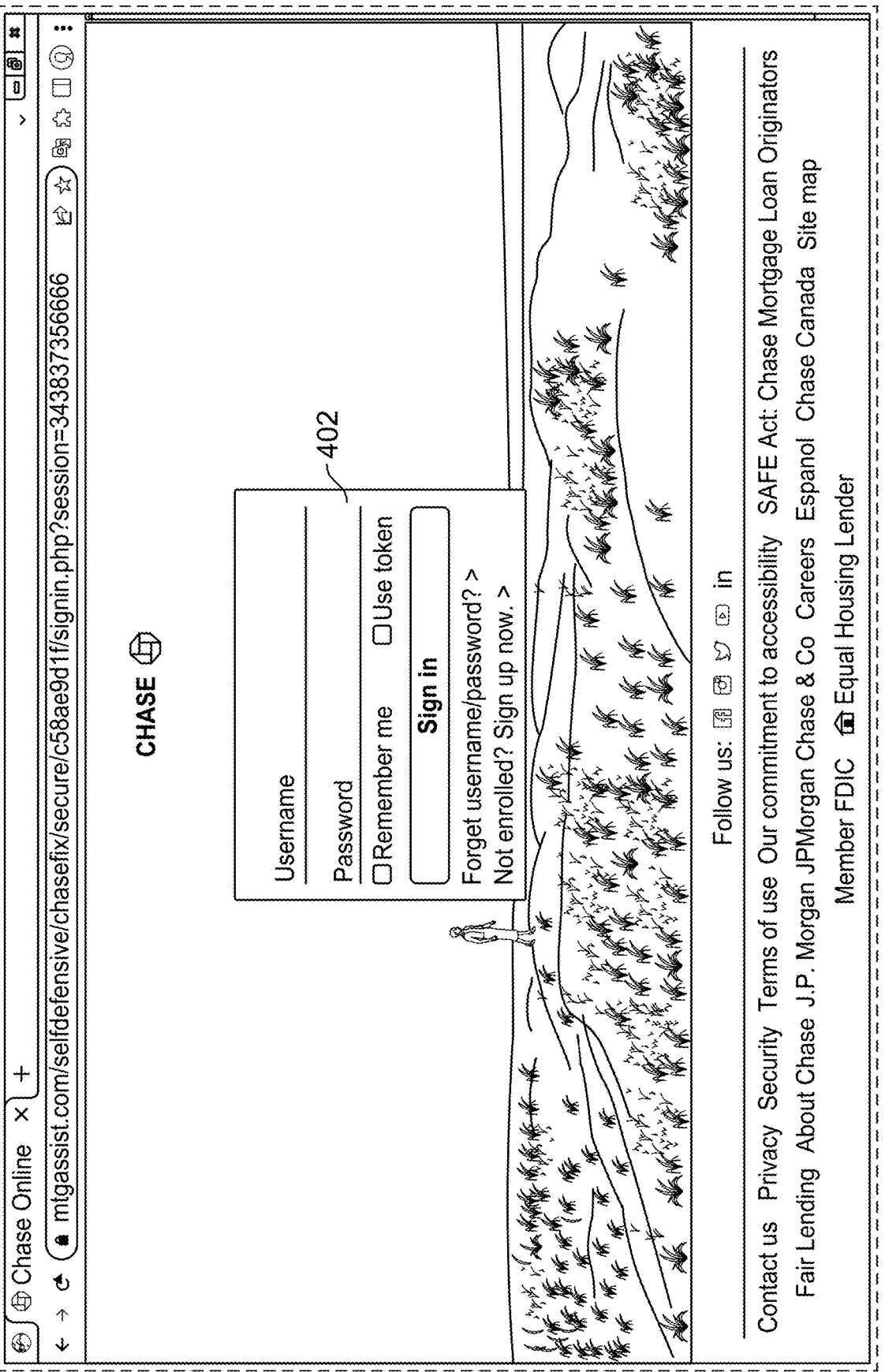
FIG. 4 illustrates an example of a traditional phishing page.

FIG. 4 illustrates an example of a traditional phishing page. In this example, the front page of the Chase website has been visually recreated. While the page itself looks deceptively similar to the legitimate Chase website, the domain of the phishing page (mtgassist.com) can be readily used to distinguish it from the legitimate Chase page (chase .com).

A variety of indicators/features can be used to identify phishing pages such as the one illustrated in FIG. 4.

A first indicator is the presence of an HTML form on the page. Granularity can further be applied to the type of form (e.g., "password form" or "credit card form"). Phishing pages typically contain HTML <form> elements. In the example shown in FIG. 4, login elements are provided as a form in region 402. A model making use of this feature could assign a score or feature value of "1.0" to the page shown in FIG. 4 for the feature "password form detected."

A second indicator is the presence of sensitive keywords in body text. Examples include "login," "password," and brand names (as in FIG. 4). A model making use of this feature could assign a score or feature value of "1.0" to the page shown in FIG. 4 for the features "login in body text," "password in body text," and "brand name in body text."

Visual signals are a third type of indicator. A screenshot can be taken of the page illustrated in FIG. 4 and compared against other screenshots of other pages. As an example, a model can be trained using screenshots of known phishing sites. A screenshot of the page shown in FIG. 4 can be analyzed using the model to determine a verdict of whether the screenshot is likely a phishing page or not. A model evaluating a screenshot of FIG. 4 might assign a score of 0.86, indicating that the page is likely to be a phishing page.

A fourth indicator is the age of the website. Shorter lived sites are more likely to be phishing pages than longer lived sites. One approach to determining website age is to look at domain registration (e.g., WHOIS) information. Another approach is to evaluate passive DNS information (described in more detail above) to determine, historically, how many times a domain has been accessed. A more frequently accessed domain (particularly over a long period of time and by many different users) is more likely to be benign. Suppose the domain "mtgassist.com" was recently registered (e.g., in the last three months) and/or that passive DNS information shows very few queries for the domain until recently (e.g., in the last month). An appropriate score can be assigned to a "website age" feature accordingly (e.g., using the number of days since the domain was first seen as a signal).

Taken together, the four indicators described above are likely to collectively identify the page shown in FIG. 4 as a phishing website (e.g., by a phishing detection engine that makes use of one or more models/heuristics when evaluating potential phishing pages). As discussed above, once identified as such (e.g., by security platform 122 analyzing the page), appropriate remedial actions can be taken, such as by including mtgassist.com on a block list and providing it to data appliance 102 so that none of clients 104-108 will be able to access it.

B. SaaS Platform Hosted Phishing Pages

While the above features (and/or other similar features) can be used to detect many phishing pages, a category of phishing page exists that can evade such detection: phishing pages hosted on legitimate Software as a Service (SaaS) platforms. Such SaaS platforms collectively provide services including website builders, form builders, file sharing sites, etc.

Figure 5A:
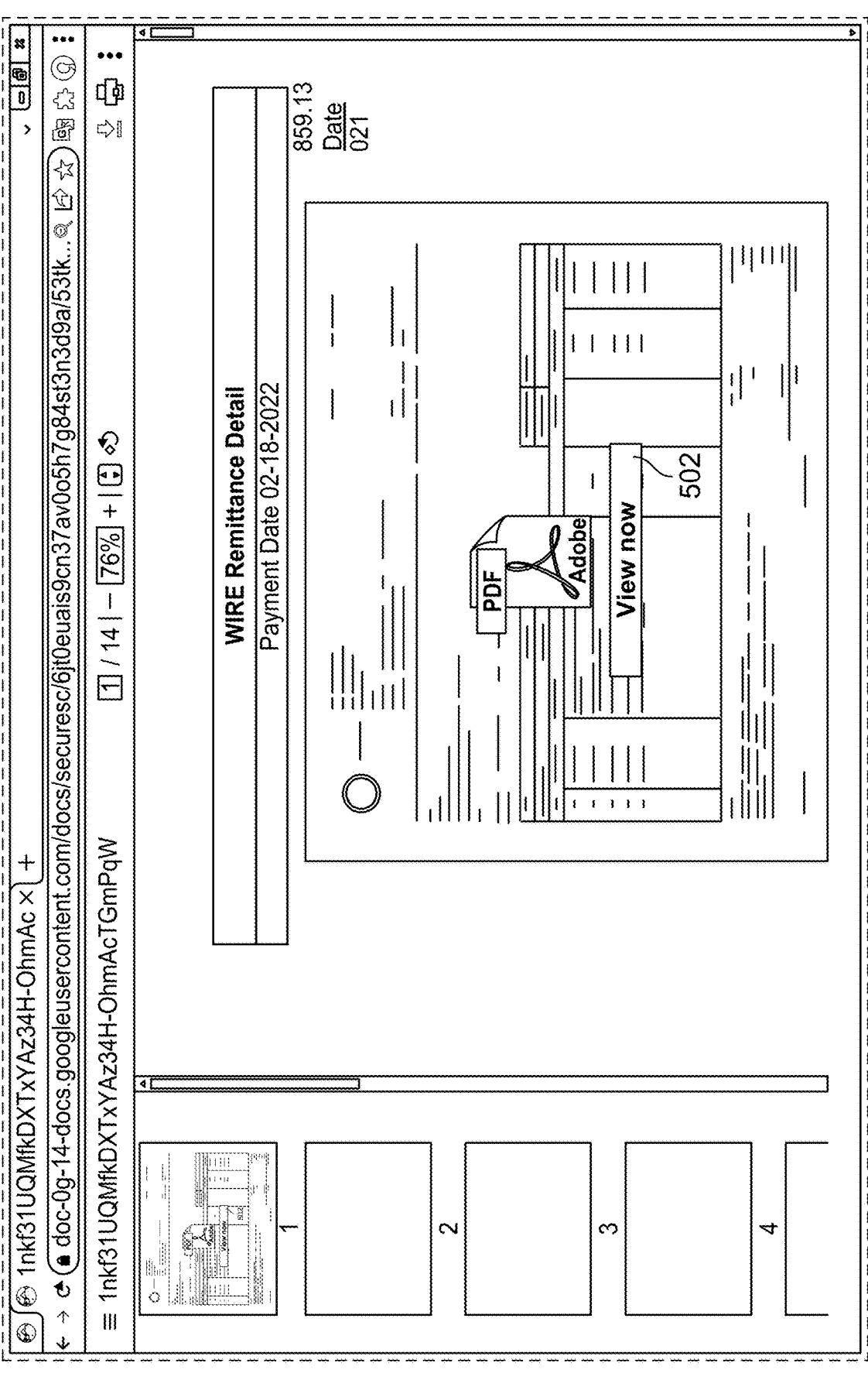
FIGS. 5A and 5B illustrate example attacks which make use of Google Drive.
Figure 5B:
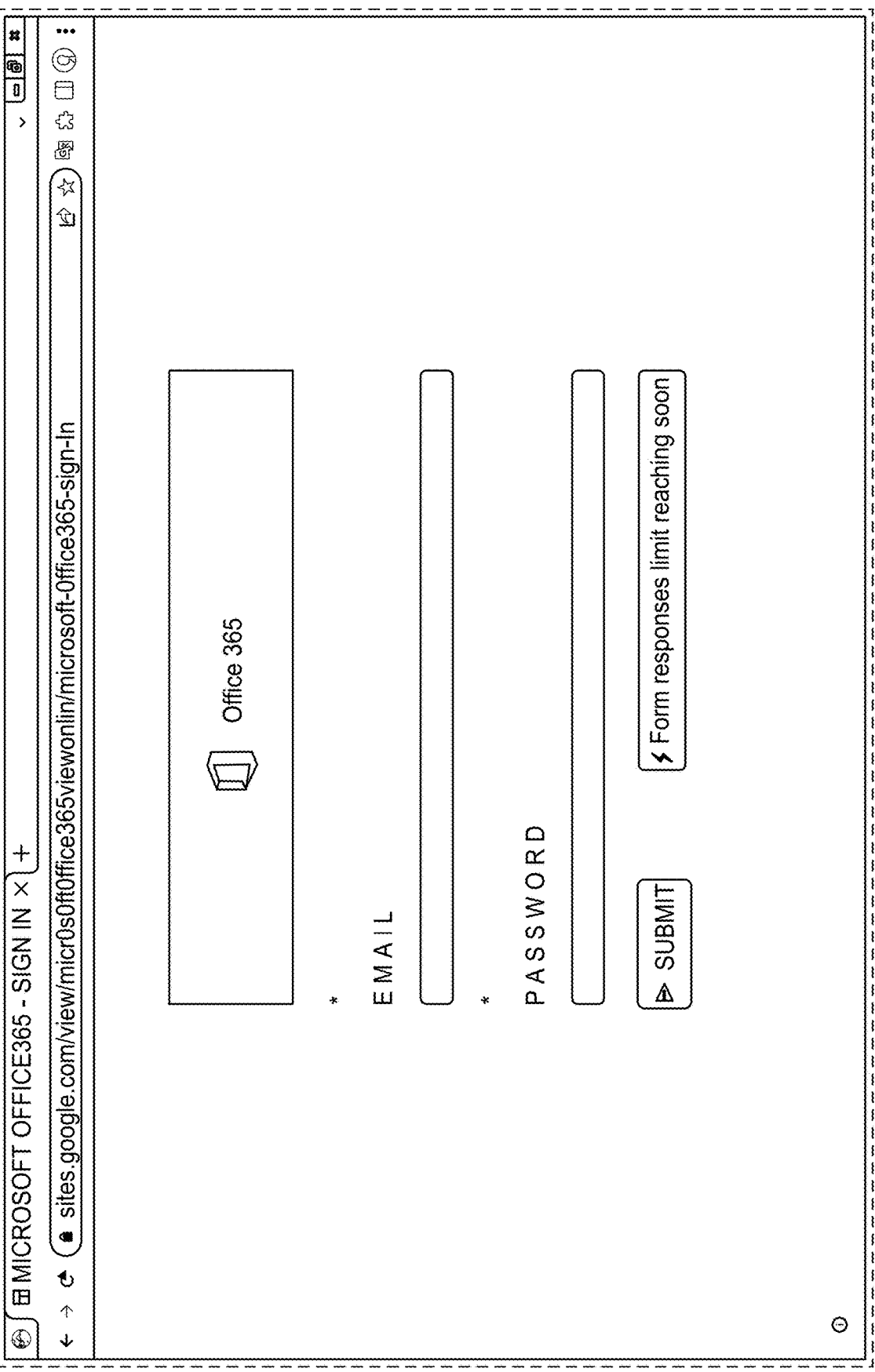

An example attack is shown in FIGS. 5A and 5B, which makes use of Google Drive. The page shown in FIG. 5A is a Google Drive preview page that purports to depict details of a wire remittance. An unsuspecting user could be sent a link to the URL by an attacker, e.g., via email. If the user clicks on the "View Now" button in region 502, they will be taken to the page shown in FIG. 5B. FIG. 5B depicts a website hosted on Google Sites that appears to be a Microsoft Office 365 login page (but is instead a phishing page). SaaS phishing attacks such as the one shown in FIGS. 5A-5B have been increasing significantly recently.

FIGS. 6A-6D depict four additional examples of attacks perpetrated using various SaaS platforms. Each of the pages poses a challenge for a traditional phishing page detector. Reasons for this include:

(1) The pages do not visually resemble typical phishing pages, so image model or image-based features learned from traditional phishing pages will be unreliable at detection.

(2) HTML content in the pages is often missing (or fetched/rendered client side), so typical HTML/text features will be unreliable at detection.

(3) Contextual or host/domain-level features (e.g., website age/passive DNS) will correspond to those of legitimate SaaS sites, and will be unreliable at detection.

Figures 6A, 6B:
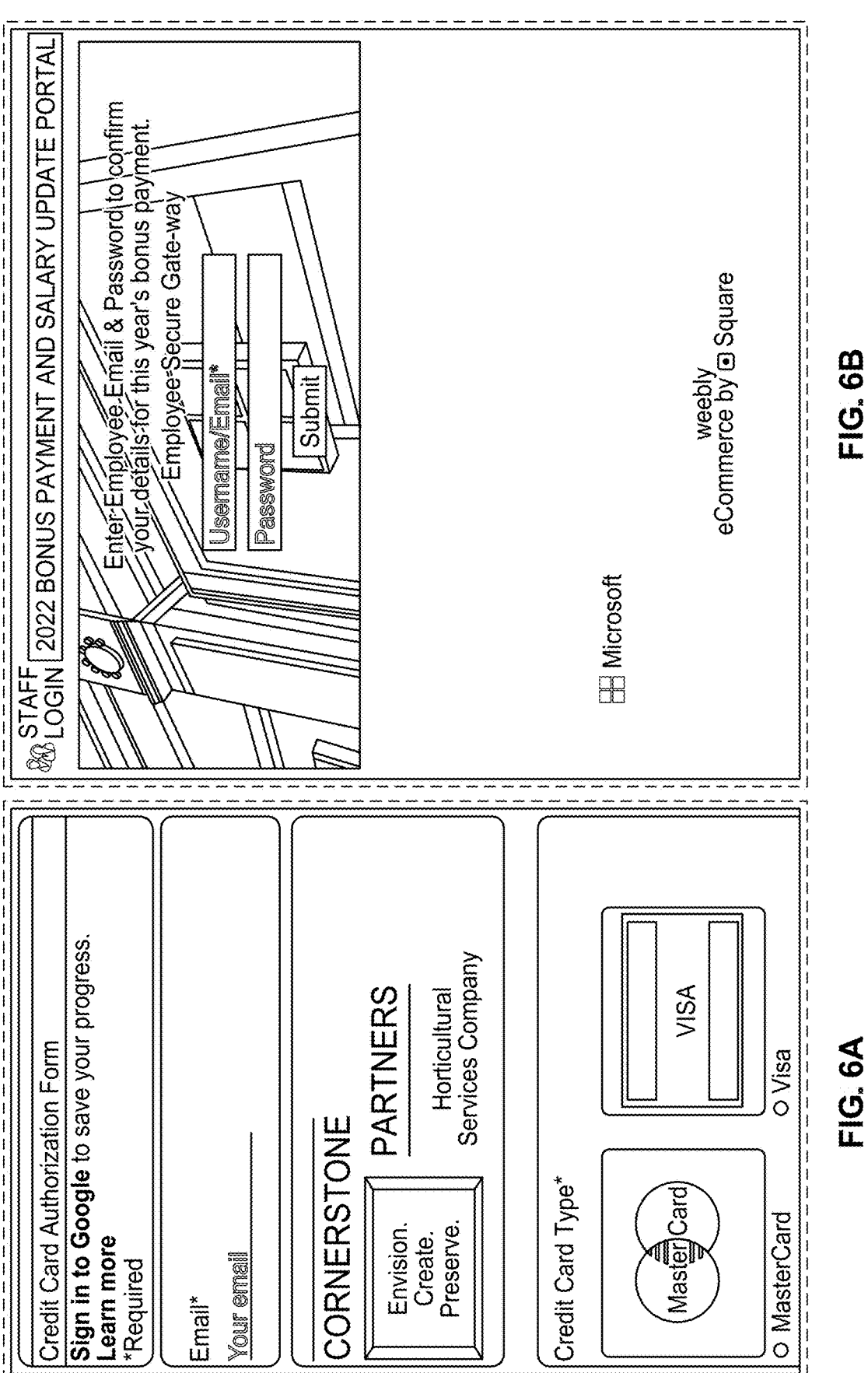
FIGS. 6A-6D depict four additional examples of attacks perpetrated using various SaaS platforms.

FIG. 6A depicts a phishing page posted on Google Forms, reachable by a URL of "https://docs.google.com/a/cphort.com/forms/d/e/ . . . . VvZP7CQ/viewform." The form asks for an email address and credit card information. Various features can be extracted (e.g., via a web crawler located on security platform 122) from the page shown in FIG. 6A. Of note, the age of the website (in days) will be a high value (e.g., 3,000), since the page is hosted on docs.google.com suggesting that the web page is benign. Similarly, another feature that could potentially be indicative of a phishing site, the validity of the SSL certificates, will also erroneously suggest the web page is valid (as google.com will have valid SSL certificates). A traditional phishing detector may thus erroneously conclude the page shown in FIG. 6A is benign.

FIG. 6B depicts a phishing page hosted on Weebly, reachable by a URL of "https://dytfg . . . 9897.weeblysite.com/." The page encourages an unsuspecting user to provide an employee email and password to confirm details for an alleged yearly bonus payment. One of the features that will be extracted by a crawler is "body text." However, in the case of the pages shown in FIG. 6B, the body text field is empty. The body content is instead rendered dynamically using JavaScript. As a result, the crawler will not be able to parse any text from the body text and thus analysis of the body text will not turn up sensitive words present on the page such as "payment" or "email" or "password." Again, a traditional phishing page analyzer could erroneously conclude the page shown in FIG. 6B is benign, particularly in combination with other erroneous features (e.g., lack of body text, website age).

Figures 6C, 6D:
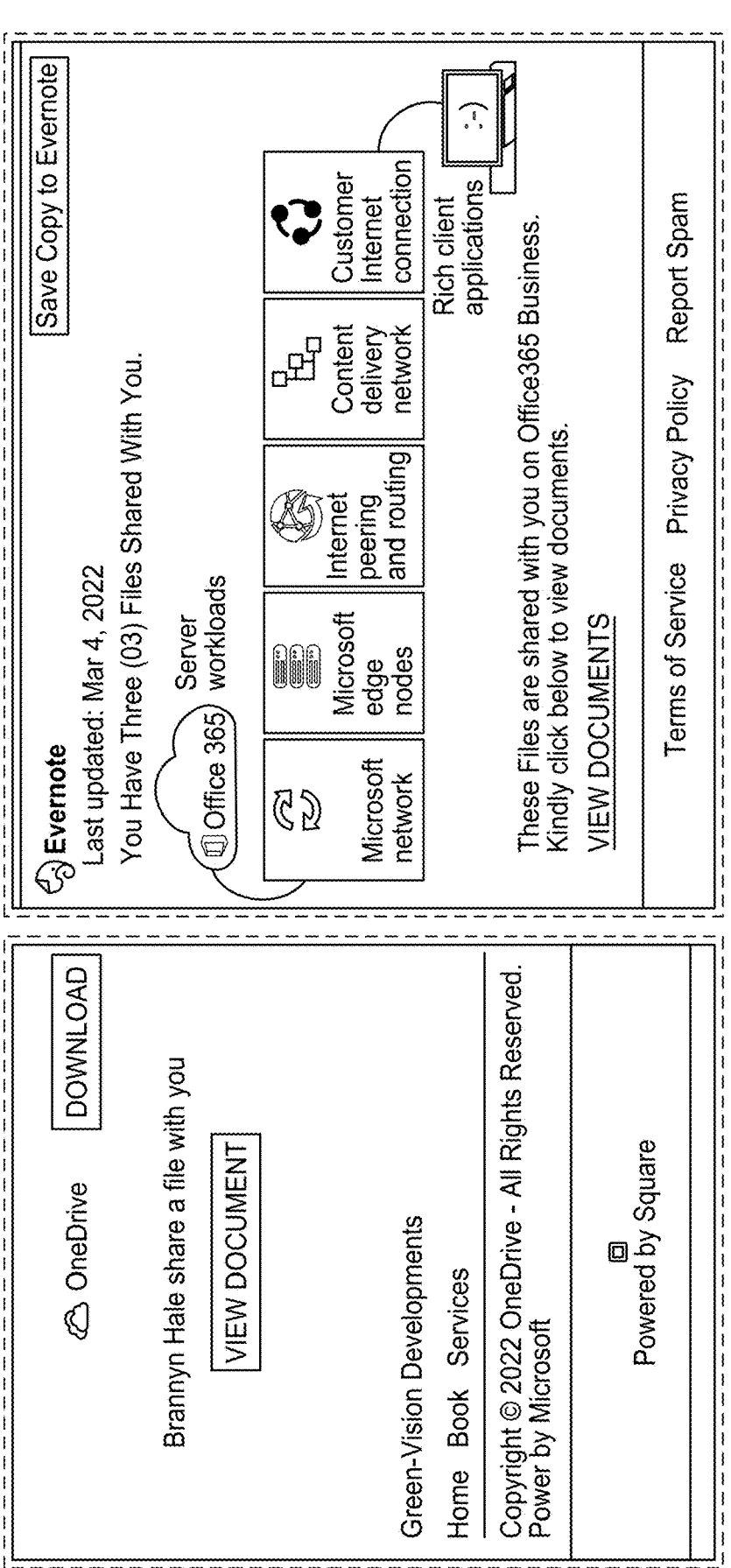

FIG. 6C depicts a phishing page hosted on Square sites, reachable by a URL of "https://brannynhale . . . developments.square.site/." The page suggests that a person has shared a document with the user via Microsoft OneDrive. A phishing image model evaluating a screenshot of the page could conclude that the page is benign (e.g., return a high "not phishing" score). A reason for this is this type of page does not match screen shots of typical phishing pages that would typically be included in a phishing page image data set (e.g., the one shown in FIG. 4). Of note, visually, there is no form present, email/password are not asked for, and the logo is very small. A traditional phishing page analyzer could erroneously conclude the page shown in FIG. 6C is benign, particularly in combination with other erroneous features (e.g., lack of body text, website age).

Finally, FIG. 6D depicts a phishing page hosted on Evernote, reachable by a URL of "https://www.evernote.com/shard/s596/client/snv?noteGuid-6c61c63e . . . title=You % 2BHave %2BThree %2B %252803%2529%2BFiles %2BShared %2BWith %2BYou." The page includes an Office 365 logo, and, a user would need to click the "VIEW DOCUMENTS" link in order to see the phishing form. The phishing score for this page will also not be high using a traditional phishing analyzer because, again, the page does not look like a typical phishing page that would be present in a training data set. No phishing form is immediately visible, and since the page is hosted on Evernote, the age of the website will again be very high.

Techniques described herein can be used to improve detection of phishing websites, and in particular can be used to overcome challenges posed in detecting phishing pages hosted on legitimate SaaS platforms.

C. Example Architectures

In various embodiments, security platform 122 includes a phishing module 164 which can be used to detect phishing pages, including those shown in FIGS. 5 and 6A-6D. In various embodiments, prefiltering is performed on a URL to be examined, to determine whether the URL is indicative of being hosted on a SaaS platform. SaaS platform hosted pages typically fall into one of a few templates. For example, Weebly pages have the form "usercreatedstring.weebly.com" and Google Forms pages have the form "docs.google.com/forms/ . . . " If a page to be evaluated (e.g., as a request made by data appliance 102 to security platform 122 or as part of ongoing analysis of sites provided by security platform 122) is determined to be SaaS hosted, it can be provided to phishing module 164 for analysis. If the page is determined not to be SaaS hosted, analysis by one or more other phishing or other modules can be performed, accordingly.

Figure 7A:
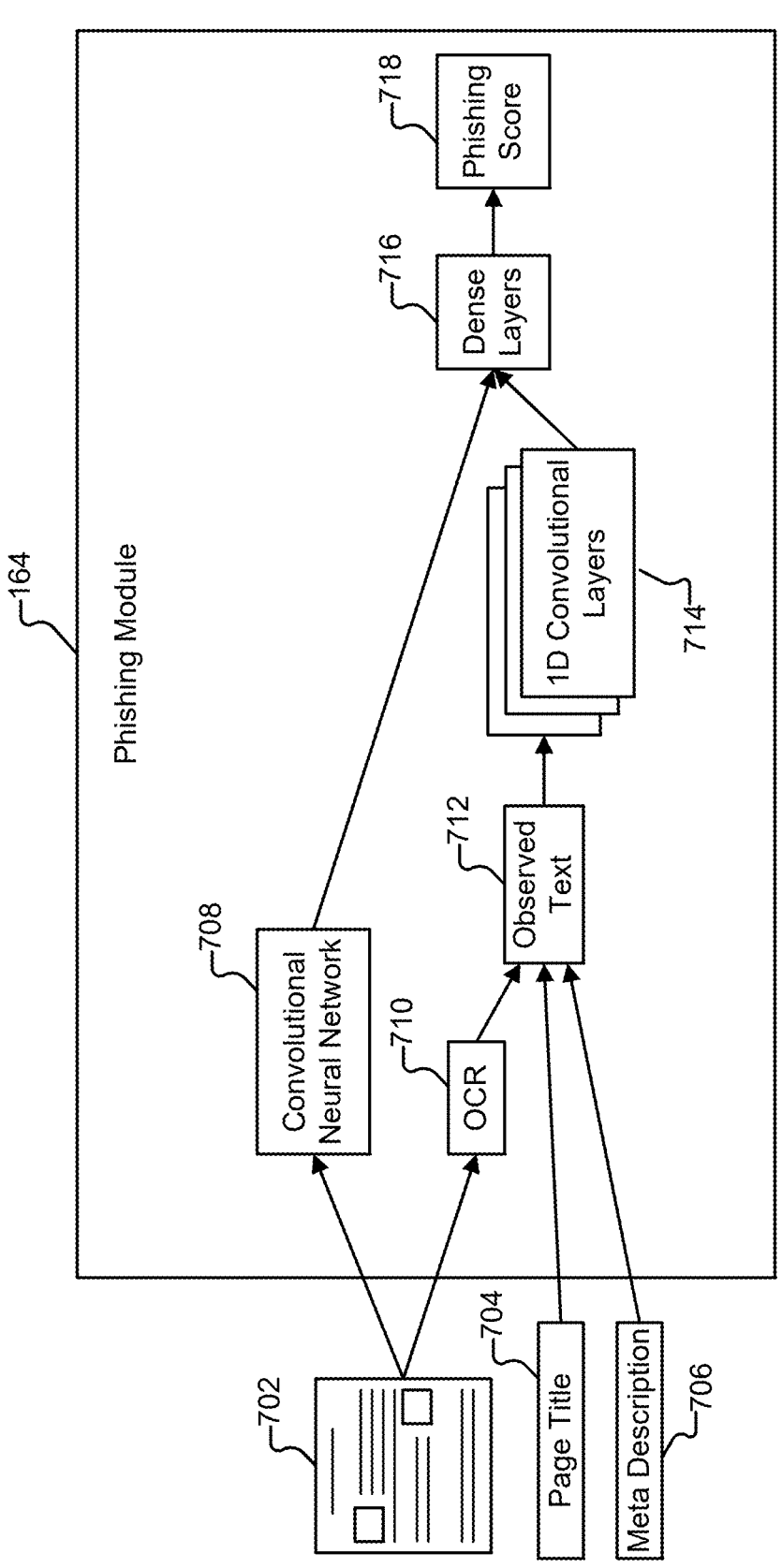
FIGS. 7A and 7B depict embodiments of a phishing module.

FIG. 7A depicts an embodiment of phishing module 164 which examines pages for both visual and textual indicators of phishing activity. The phishing module takes as input a screenshot of a page to be evaluated (702), the page title (704), and page meta description (706). The screenshot is provided to a convolutional neural network (CNN) 708 (e.g., ResNet50v2) to identify visual features indicative of phishing. The CNN is a specialized model trained using known SaaS phishing pages (e.g., those shown in FIGS. 5A-5B and FIGS. 6A-6D) instead of traditional phishing pages (e.g., as shown in FIG. 4).

The screenshot is also subjected to optical character recognition (OCR) using an OCR tool (710) such as Paddle OCR. Text extracted by the OCR tool from the screenshot is combined with the page title and meta description (e.g., via concatenation) into observed text 712. The observed text is provided to a series of 1D convolutional layers (714) which analyze the text (e.g., at a character level) to look for patterns or keywords that are indicative of phishing. Examples of such patterns include "login" or "invoice received" or "urgent payment request." OCR is often imperfect, but since observed text analysis is performed at a character level, perfect token match is not required. E.g., "lugin" or "Invoice recelveb" could be considered matches for sensitive words as well. Further, OCR can detect text not found in the HTML body (particularly when the body is blank). For example, text appearing in logos such as "Office 365" or "Outlook" will be identified via OCR and can thus be considered during analysis, as content where page text is wholly (or significantly) rendered in images instead of as body text.

A series of dense layers 716 are run using the combined features of CNN 708 and convolutional layers 714. The dense layers are neural network layers that produce a final score for the page (e.g., between 0 and 1) indicative of whether it is a phishing page or not.

Figure 7B:
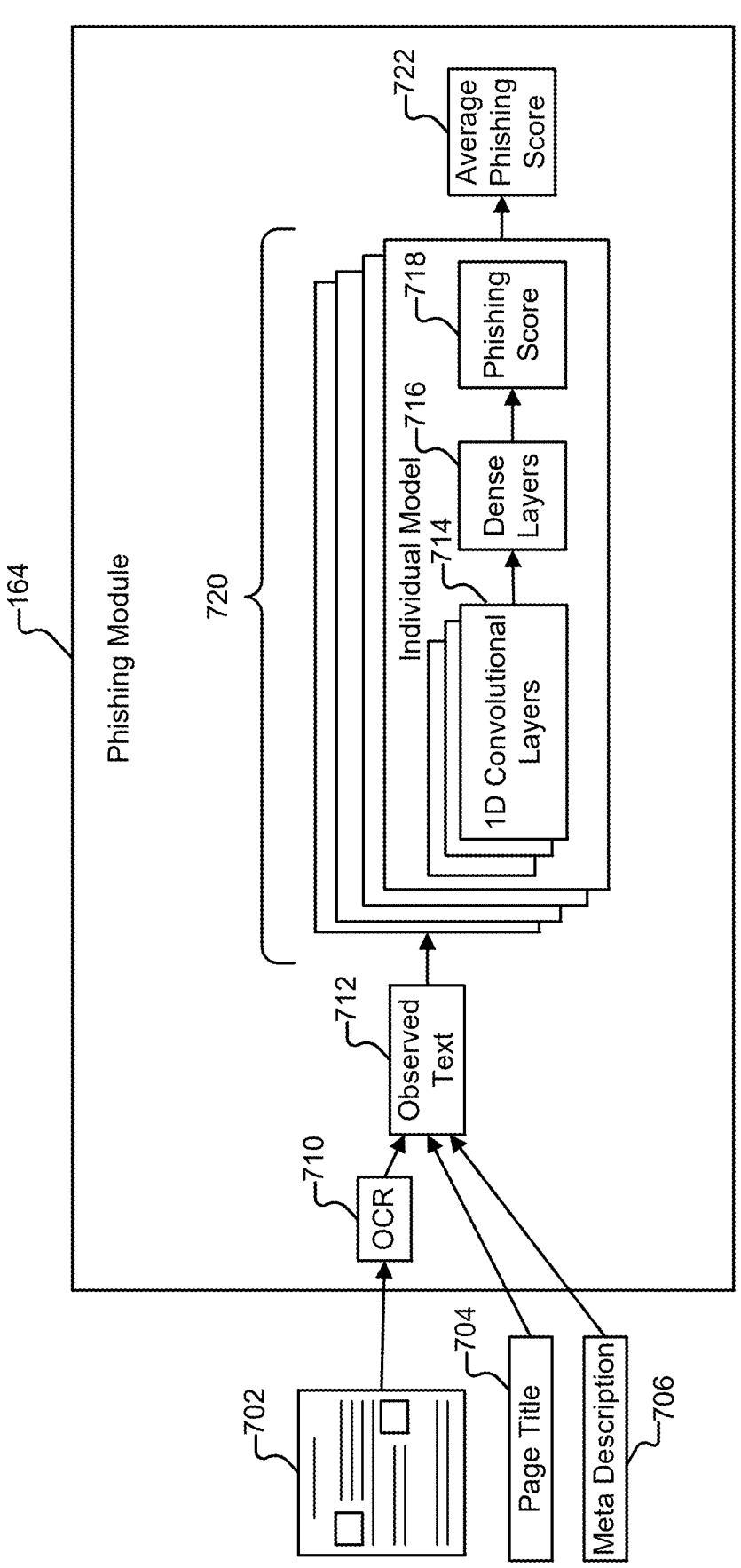

FIG. 7B depicts an alternate embodiment of phishing module 164. In the embodiment shown in FIG. 7B, convolutional neural network 708 is omitted-only textual analysis is performed. Further, an ensemble (e.g., four instances) of convolutional layers (720) are trained independently. Each of the models in the ensemble is initialized with slightly different hyperparameters (e.g., whether to use batch normalization or label smoothing). The scores of each of the four individual models are averaged together to form an average phishing score 722. In an alternate embodiment of the phishing module shown in FIG. 7B, only a single model is used, instead of an ensemble.

Figure 8:
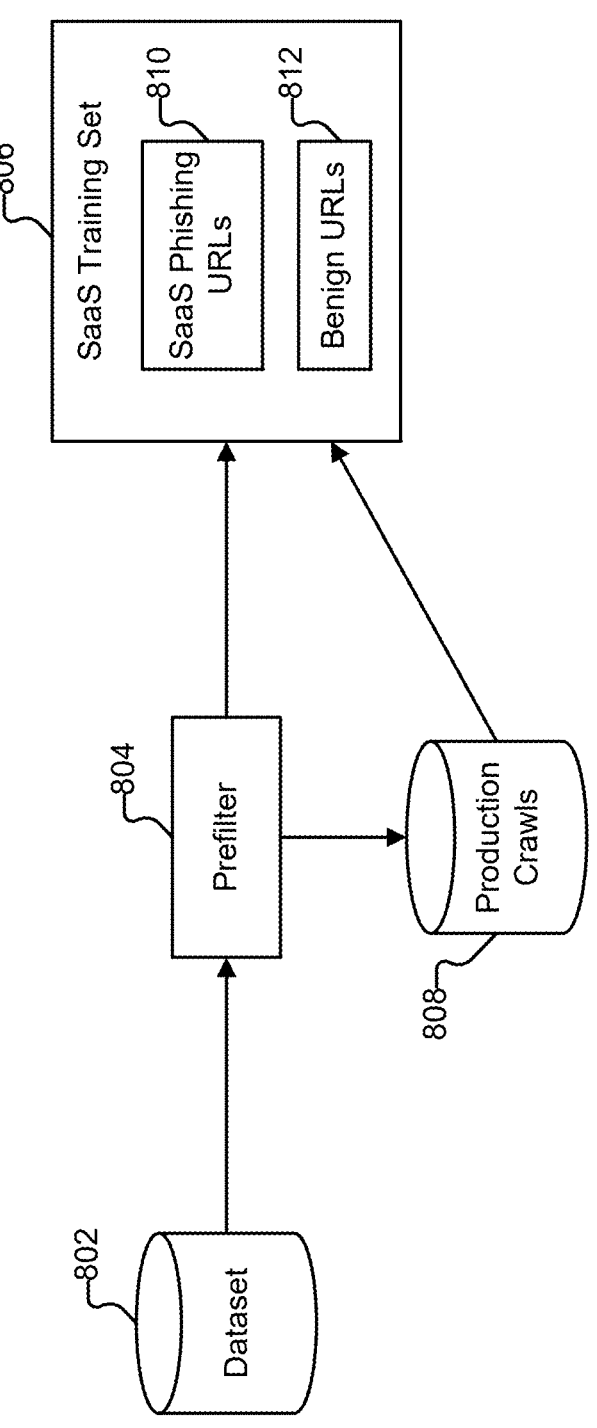
FIG. 8 illustrates an example of a data collection pipeline.

FIG. 8 illustrates an example of a data collection pipeline that can be used to collect samples of both benign and phishing SaaS hosted pages for use in training models usable by phishing module 164. The pipeline automatically accommodates new SaaS platforms (having various URL patterns), without requiring manual per-platform configuration. In particular, the pipeline generates templates of possible SaaS platform phishing URLs, with coverage increasing over time.

In some embodiments, dataset 802 (stored, e.g., in storage 142) includes both known benign and phishing URLs, for both SaaS-hosted and non-SaaS hosted pages. In other embodiments, dataset 802 includes only known phishing URLs (or known SaaS phishing URLs). New SaaS platforms can be identified and added, as applicable, either manually, or automatically. One approach to the automatic addition of a new SaaS platform is to look at metrics such as the variance of the content between different pages/subdomains hosted at the domain, and the frequency with which new subdomains/pages are created. Another approach to the automatic addition of a new SaaS platform is to use APP-ID signatures.

Known Phishing URLs from database 802 are provided to prefilter 804. An example way of implementing prefilter 804 is as a REST API on Google Cloud Platform. Using the URL "viewremittancedoc.weebly.com" as an example, prefilter 804 performs the following:

1. Tokenize the URL into key parts (e.g., splitting the hostname based on periods and the path based on slashes). In this case: "viewremittancedoc," "weebly," and "com" are the tokens.
2. Obtain token counts across the entire dataset, leaving frequent tokens untouched. In this case: "weebly" and "com" are frequently found in database 802, but "viewremittancedoc" is infrequent.
3. Classify infrequent tokens into one of "RANDOM," "NUMERIC," or "USERCREATED." A way of making this determination is to first determine, e.g., using Markov-chain probability, whether the string is random (i.e., if a string's randomness score exceeds a threshold it is classified as RANDOM). If a string is not determined to be random, and if every character in the string is numeric, it is classified as NUMERIC. If a string is neither random nor numeric, it is classified as USERCREATED. The token, "viewremittancedoc" is a user created (but not frequent) string and thus classified as USERCREATED.
4. Recombine tokens into a URL pattern. In this case: USERCREATED.weebly.com.
5. Count the appearances of each URL pattern (e.g., USERCREATED.weebly.com) in the dataset (e.g., dataset 802). In an example dataset, the following are examples of URL patterns and corresponding counts of known phishing URLs in dataset 802:

USERCREATED.weebly.com 6001
bit.ly/RANDOM 5617
USERCREATED.sharepoint.com/:o:/g/personal/USER-CREATED/RANDOM 2381
docs.google.com/forms/d/e/RANDOM/viewform 632
USERCREATED.wixsite.com/my-site 541

In some embodiments, a frequency threshold is applied before a pattern is designated as a SaaS phishing pattern. If only a single phishing URL matches a particular pattern, it could be a false positive, and erroneously including it in a phishing training set could be problematic. An example frequency threshold is three: if at least three phishing URLs match a particular pattern, then the pattern can potentially be included in training set 806 (among other SaaS phishing URLs).

If SaaS training set 806 only included SaaS phishing URLs 810, detection models used by embodiments of phishing module 164 could over fit, erroneously concluding that any URLs matching the above mentioned patterns are indicative of SaaS phishing. Accordingly, benign examples of SaaS pages matching such patterns also need to be included in training set 806 so that the model can learn to differentiate the two. In the example data pipeline shown in FIG. 8, benign examples are obtained from production crawls 808 (e.g., traffic collected from networks 140, 114, and 116 via their respective data appliances). Production crawls matching the URL patterns (e.g., as determined by prefilter 804) are then analyzed (e.g., by querying a categorization service provided by security platform 122 and also VirusTotal) to ensure that the pattern matching URLs are benign. If so, they can be added to SaaS training set 806 as benign SaaS URLs 812. An example size of SaaS training set 806 is 50 k phishing URLs and 50 k benign URLs.

D. Example Detection Process

Figure 9:
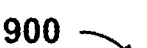
FIG. 9 illustrates an embodiment of a process for detecting SaaS platform hosted phishing URLs.
Figure 9:
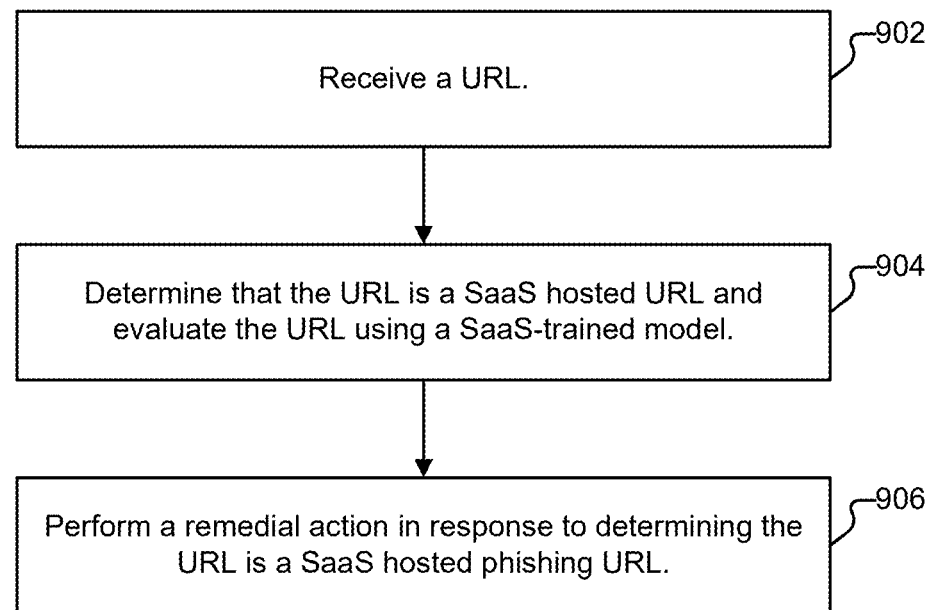

FIG. 9 illustrates an embodiment of a process for detecting SaaS platform hosted phishing URLs. In various embodiments, process 900 is performed by security platform 122. Process 900 can also be performed by other entities, such as embodiments of data appliance 102 (e.g., where an embodiment of phishing module 164 is collocated on data appliance 102).

Process 900 begins at 902 when a URL is received. As one example, a URL can be received at 902 by security platform 122 from data appliance 102 (e.g., where a verdict for the URL is not present in a cache on data appliance 102). As another example, a URL can be received at 902 by security platform 122 from a feed (e.g., provided by another component of security platform 122 such as a crawler/URL classifier pipeline, or provided by a third party service such as VirusTotal).

At 904, a determination is made that the received URL is a SaaS hosted URL. One approach to performing this determination is to compare the received URL against a list of known SaaS domains (or use a tool such as APP-ID to determine a category for the URL, e.g., as "document sharing"). Another approach is to have prefilter 804 (or another appropriate component or set of components) evaluate the received URL against a set of known SaaS phishing patterns (e.g., the set of patterns used as inclusion criteria for SaaS training set 806). If the URL matches a known pattern (that is above the threshold number, such as three, as described above), it can be considered a SaaS hosted URL for phishing analysis purposes.

In response to determining that the received URL is a SaaS hosted URL, the URL is evaluated using one or more SaaS-trained phishing models. In the example environment shown in FIG. 7A, a screenshot 702, the page title 704, and the metadata description 706 of the page would be provided at 904 to phishing module 164. Phishing module 164 would then analyze the received information using models 708, 714, and 716 to determine a phishing score 718. In the example environment shown in FIG. 7B, the screenshot/page title/metadata description are analyzed using ensemble models 720 to determine an average phishing score 722.

If the received URL is determined to be a SaaS hosted phishing URL (e.g., phishing score 718 or average phishing score 722 exceeds a threshold), a remedial action is taken at 906. One example action that can be taken is that the URL can be added to a list/database of known phishing URLs (e.g., hosted by security platform 122). The list of known phishing URLs (including the URL received at 902) can be propagated to data appliances such as data appliance 102, 136, and 148, to ensure that any end users of networks 140, 114, and 116 will be protected (blocked) from accessing the identified URL.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a Uniform Resource Locator (URL);
      determine that the received URL is a Software as a Service (SaaS) platform hosted URL, including by determining a match between a domain portion of the URL and a list of known legitimate SaaS platform domains, and in response to determining that the received URL is a SaaS platform hosted URL, evaluate the URL using a model trained on SaaS hosted content; and
      perform a remedial action in response to determining that the received URL is a phishing URL; and
   a memory coupled to the processor and configured to provide the processor with instructions.

2. The system of claim 1, wherein determining that the received URL is a SaaS hosted URL includes tokenizing the URL.

3. The system of claim 2, wherein the processor is further configured to determine, for each token determined during the tokenization, whether that token is frequent or infrequent in a dataset.

4. The system of claim 3, wherein the processor is further configured to determine, for an infrequent token, a classification.

5. The system of claim 4, wherein the classification is selected from a set comprising: (1) random, (2) numeric, and (3) user-created.

6. The system of claim 1, wherein determining that the received URL is a SaaS hosted URL includes comparing the URL against a list of known SaaS phishing patterns.

7. The system of claim 1, wherein determining that the received URL is a SaaS hosted URL includes evaluating a domain of the URL.

8. The system of claim 1, wherein the processor is further configured to obtain a screenshot of content accessible via the URL.

9. The system of claim 8, wherein the processor is further configured to perform optical character recognition (OCR) on the screenshot.

10. The system of claim 9, wherein the processor is further configured to concatenate text obtained via the OCR with additional observed text.

11. The system of claim 1, wherein the model is trained at least in part on screenshots of known SaaS phishing pages.

12. The system of claim 1, wherein the model is trained at least in part on a training set comprising known SaaS phishing URLs and known benign SaaS URLs.

13. The system of claim 1, wherein the model is one of a plurality of models trained on the SaaS hosted content used to evaluate the URL.

14. The system of claim 1, wherein the model comprises a series of one-dimensional convolutional layers that analyze text at the character level.

15. The system of claim 1, wherein performing the remedial action includes adding the URL to a block list.

16. The system of claim 1, wherein performing the remedial action includes providing a verdict of phishing to a data appliance.

17. A method, comprising:
   receiving a Uniform Resource Locator (URL);
   determining that the received URL is a Software as a Service (SaaS) platform hosted URL, including by determining a match between a domain portion of the URL and a list of known legitimate SaaS platform domains, and in response to determining that the received URL is a SaaS platform hosted URL, evaluating the URL using a model trained on SaaS hosted content; and performing a remedial action in response to determining that the received URL is a phishing URL.

18. The method of claim 17, wherein determining that the received URL is a SaaS hosted URL includes tokenizing the URL.

19. The method of claim 18, further comprising determining, for each token determined during the tokenization, whether that token is frequent or infrequent in a dataset.

20. The method of claim 19, further comprising, determining, for an infrequent token, a classification.

21. The method of claim 20, wherein the classification is selected from a set comprising: (1) random, (2) numeric, and (3) user-created.

22. The method of claim 1, wherein determining that the received URL is a SaaS hosted URL includes comparing the URL against a list of known SaaS phishing patterns.

23. The method of claim 17, wherein determining that the received URL is a SaaS hosted URL includes evaluating a domain of the URL.

24. The method of claim 17, further comprising obtaining a screenshot of content accessible via the URL.

25. The method of claim 24, further comprising performing optical character recognition (OCR) on the screenshot.

26. The method of claim 25, further comprising concatenating text obtained via the OCR with additional observed text.

27. The method of claim 17, wherein the model is trained at least in part on screenshots of known SaaS phishing pages.

28. The method of claim 17, wherein the model is trained at least in part on a training set comprising known SaaS phishing URLs and known benign SaaS URLs.

29. The method of claim 17, wherein the model is one of a plurality of models trained on the SaaS hosted content used to evaluate the URL.

30. The method of claim 17, wherein the model comprises a series of one-dimensional convolutional layers that analyze text at the character level.

31. The method of claim 17, wherein performing the remedial action includes adding the URL to a block list.

32. The method of claim 17, wherein performing the remedial action includes providing a verdict of phishing to a data appliance.

33. A computer program product embodied in a non-transitory computer readable medium and comprising computer instructions for:

receiving a Uniform Resource Locator (URL);

determining that the received URL is a Software as a Service (SaaS) platform hosted URL, including by determining a match between a domain portion of the URL and a list of known legitimate SaaS platform domains, and in response to determining that the received URL is a SaaS platform hosted URL, evaluating the URL using a model trained on SaaS hosted content; and performing a remedial action in response to determining that the received URL is a phishing URL.

* * * * *